(12) United States Patent
Okamura

(10) Patent No.: US 6,987,618 B2
(45) Date of Patent: Jan. 17, 2006

(54) POLARIZATION CONVERTING DEVICE, ILLUMINATION OPTICAL SYSTEM AND PROJECTOR

(75) Inventor: Tetsuro Okamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/770,818

(22) Filed: Feb. 3, 2004

(65) Prior Publication Data
US 2004/0212893 A1    Oct. 28, 2004

(30) Foreign Application Priority Data
Feb. 4, 2003  (JP) ............................. 2003-026952

(51) Int. Cl.
*G02B 27/10*  (2006.01)
(52) U.S. Cl. .................................... 359/618; 359/627
(58) Field of Classification Search ................ 359/618, 359/627, 494–498
See application file for complete search history.

(56) References Cited

U.S. PATENT DOCUMENTS

| | | | | |
|---|---|---|---|---|
| 5,729,306 A | * | 3/1998 | Miyake et al. | .................. 349/9 |
| 5,764,412 A | * | 6/1998 | Suzuki et al. | ................ 359/487 |
| 6,411,438 B1 | * | 6/2002 | Itoh et al. | .................... 359/497 |
| 6,536,902 B2 | * | 3/2003 | Lee | .............................. 353/20 |
| 6,587,268 B1 | * | 7/2003 | Bierhuizen | .................. 359/497 |
| 6,633,435 B2 | * | 10/2003 | Akiyama et al. | ........... 359/619 |
| 2003/0085346 A1 | * | 5/2003 | Yamawaki | .................. 250/234 |
| 2004/0218505 A1 | * | 11/2004 | Hayashi | ................. 369/112.16 |
| 2004/0233342 A1 | * | 11/2004 | Kim et al. | ..................... 349/6 |
| 2004/0240059 A1 | * | 12/2004 | Li | .............................. 359/497 |

* cited by examiner

*Primary Examiner*—Ricky Mack
(74) *Attorney, Agent, or Firm*—Frommer Lawrence & Haug LLP; William S. Frommer; Darren M. Simon

(57) ABSTRACT

Provided are a polarization converting device capable of downsizing parts and improving light-use efficiency, and an illumination optical system capable of obtaining illuminating light with high efficiency and superior illumination characteristics by using the polarization converting device, and a projector. A polarization splitting film is inclined at approximately 45° upward and downward with respect to an optical axis, thereby the polarization splitting film is formed in the shape of the letter V of which the apex is pointed to a direction where incident light enters. A reflective surface has such a shape that the polarization splitting film is horizontally flipped, thereby it is formed in the shape of the letter V of which the apex is pointed to a direction where a polarized component is emitted. A plurality of pairs of the polarization splitting film with the shape of the letter V and the reflective surface with the shape of the letter V in which their apexes are pointed to different directions are disposed in parallel. In this case, the polarization splitting film and the reflective surface are disposed so as not to overlay each other in a thickness direction (an optical axis direction).

1 Claim, 8 Drawing Sheets

POLARIZATION CONVERTING DEVICE, ILLUMINATION OPTICAL SYSTEM AND PROJECTOR

BACKGROUND OF THE INVENTION

1. Field of the Invention

The present invention relates to a polarization converting device for converting incident light into required polarized light, an illumination optical system using the same, and a projector using the same.

2. Description of the Related Art

Apparatuses using polarized light are conventionally known. For example, in a projection display apparatus (projector) using a liquid crystal display panel or the like, linearly polarized light is used as illuminating light to a display panel. In such an apparatus, a polarization converting device is used to obtain required polarized light.

FIG. 1 shows an example of an illumination optical system used in a projector or the like. The illumination optical system comprises a first lens array 112, a second lens array 113 and a polarization converting device array 114 along an optical axis C1.

The first lens array 112 includes a plurality of convex lens cells 112A with positive refractive power, and the plurality of convex lens cells 112A are arranged in matrix form. The second lens array 113 includes a plurality of convex lens cells 113A with positive refractive power each corresponding to each lens cell 112A of the first lens array 112, and the plurality of convex lens cells 113A are arranged in matrix form.

The polarization converting device array 114 converts an incident non-polarized luminous flux into linearly polarized light. As shown in an enlarged view of FIG. 2, the polarization converting device array 114 includes a plurality of polarization splitting films 114A and a plurality of reflective surfaces 114B, which are alternately arranged. On an outgoing side of the polarization converting device array 114, a plurality of half-wave plates 114C are disposed with a predetermined spacing. Moreover, on an incoming side of the polarization converting device array 114, a light-shielding plate 130 having an aperture portion 130A in a predetermined position is disposed. The polarization splitting film 114A and the reflective surface 114B are disposed at an angle of approximately 45° with respect to the optical axis C1.

In the illumination optical system, light from a light source (not shown) is divided into a plurality of luminous fluxes by each lens cell 112A of the first lens array 112, and the plurality of luminous fluxes are condensed in proximity to an aperture portion of each lens cell 113A of the corresponding second lens array 113. The non-polarized luminous fluxes having passed through the second lens array 113 enter from the aperture portion 130A of the light-shielding plate 130 to the polarization converting device array 114.

In the polarization converting device array 114, as shown in FIG. 2, the incident light is divided into a S-polarized component and a P-polarized component by the polarization splitting film 114A. S-polarized light reflected by the polarization splitting film 114A is further reflected by the reflective surface 114B, and the S-polarized light is emitted from the polarization converting device array 114. On the other hand, P-polarized light having passed through the polarization splitting film 114A passes through the half-wave plate 114C to be converted into S-polarized light, then the S-polarized light is emitted from the polarization converting device array 114. As a result, all of luminous fluxes emitted from the polarization converting device array 114 are emitted as linearly S-polarized light. The S-polarized light is used as illuminating light to the display panel, for example. In addition, when the position of the half-wave plate 114C is shifted, a final polarized component can become P-polarized light.

Examples of a conventional polarization converting device which obtains linearly polarized light through using a polarization split surface and a reflective surface include Japanese Unexamined Patent Application Publication No. Hei 4-310903, Japanese Unexamined Patent Application Publication No. Hei 5-72417 and Japanese Patent No. 3298580.

However, conventionally, it is necessary that the light-shielding plate 130 such as a light-shielding slit, or a light-shielding film is disposed on the incoming side so that light beams which cannot be condensed in the aperture portion 130A on the incoming side of the polarization converting device array 114 are not emitted from the polarization converting device array 114 as unnecessary polarized light, thereby light enters only from the aperture portion 130A to the polarization converting device array 114. More specifically, in the case where the light-shielding plate 130 is not disposed, as shown in FIG. 3, light having entered into a portion except for the aperture portion 130A on the incoming side is reflected by the reflective surface 114B, then the light enters into the polarization splitting film 114A. The S-polarized light reflected by the polarization splitting film 114A passes through the half-wave plate 114C to be converted into P-polarized light, then the P-polarized light is emitted from the polarization converting device array 114. Further, the P-polarized light having passed through the polarization splitting film 114A is reflected by another reflective surface 114B, then is emitted from the polarization converting device array 114. Thus, in the case where the light-shielding plate 130 is not disposed on the incoming side, a polarized component different from a necessary component is emitted. The unnecessary polarized component is not preferable specifically in the projector, because the unnecessary polarized component causes heat load of the polarizing plate disposed on the incoming side of the display panel. Further, for the purpose of reducing the size of the polarization converting device array 114, it is not preferable to dispose the light-shielding plate 130.

Moreover, as shown in FIG. 2, a light beam 212 reflected by the polarization splitting film 114A and then by the reflective surface 114B has an optical path length in a substrate of the polarization converting device which is twice as long as the thickness of the substrate, compared to a light beam 211 having passed through the polarization splitting film 114A. Therefore, in the light beam 212, the spread of a luminous flux is larger than that in the light beam 211, but the size of an aperture for the light beam 211 on the outgoing side of the polarization converting device array 114 is the same as that for the light beam 212, so the amount of eclipse of the luminous flux is large in an aperture portion 140 for the light beam 212, which causes a decline in light-use efficiency.

Further, in the light beam 212, in addition that the optical path length becomes longer than that in the light beam 211 having passed through the polarization splitting film 114A, the optical axis of the light beam 212 is shifted to one side by the thickness of the substrate, so in the case where the light beam 212 is used as illuminating light, illumination performance in a light-illuminated surface declines, and the shape of an illumination area and light-use efficiency becomes worse, compared to the light beam 211, thereby a balance in the whole light illumination range becomes worse.

SUMMARY OF THE INVENTION

In view of the foregoing, it is an object of the invention to provide a polarization converting device capable of downsizing parts and improving light-use efficiency, and an illumination optical system capable of obtaining illuminating light with efficiency and superior illumination properties by using the polarization converting device, and a projector.

A polarization converting device according to a first aspect of the invention comprises: a polarization splitting surface dividing incident light into a first polarized component and a second polarized component orthogonal to each other by reflecting the incident light and allowing the incident light to pass therethrough; a reflective surface reflecting the first polarized component reflected by the polarization splitting surface toward a direction where the second polarized component having passed through the polarization splitting surface is emitted; and a half-wave plate being disposed on the optical path of either the first or the second polarized component, and converting the polarization direction of either the first or the second polarized component into the same polarization direction as that of the other polarized component, wherein the polarization splitting surface has the shape of the letter V of which the apex is pointed to a direction where the incident light enters, and the reflective surface has the shape of the letter V of which the apex is pointed to a direction where the first and the second polarized components are emitted.

An illumination optical system according to a first aspect of the invention comprises: a first lens array dividing a non-polarized luminous flux emitted from a light source into a plurality of pencils of partial light; a second lens array superimposing the pencils of partial light divided by the first lens array on an illumination area; and a polarization converting device array converting each of the pencils of non-polarized partial light emitted through the second lens array into linearly polarized light, and the polarization converting device array comprises: a polarization splitting surface, a reflective surface and a half-wave plate all of which are the same as those comprised in the polarization converting device according to the first aspect of the invention, and a plurality of pairs of the polarization splitting surface with the shape of the letter V and the reflective surface with the shape of the letter V in which the apexes are pointed to different directions are disposed in parallel.

A projector according to a first aspect of the invention comprises: a light source; an illumination optical system dividing a non-polarized luminous flux emitted from the light source into a plurality of pencils of partial light to emit the plurality of pencils of partial light as illuminating light; an image display device modulating light emitted from the illumination optical system according to a given image signal; and a projecting means projecting light modulated by the image display device, and as the illumination optical system, the illumination optical system according to the first aspect of the invention is comprised.

A polarization converting device according to a second aspect of the invention comprises: a pair of prism blocks each including: a polarization splitting surface being inclined with respect to an optical axis, and dividing incident light into a first polarized component and a second polarized component orthogonal to each other through reflecting the incident light and allowing the incident light to pass therethrough; a reflective surface being inclined toward the same direction as the polarization splitting surface, and reflecting the first polarized component reflected by the polarization splitting surface toward a direction where the second polarized component having passed through the polarization splitting surface is emitted; and a half-wave plate being disposed on the optical path of either the first or the second polarized component, and converting the polarization direction of either the first or the second polarized component into the same polarization direction as that of the other polarized component, wherein the pair of prism blocks are symmetrically opposed.

An illumination optical system according to a second aspect of the invention comprises: a first lens array dividing a non-polarized luminous flux emitted from a light source into a plurality of pencils of partial light; a second lens array superimposing the pencils of partial light divided by the first lens array on an illumination area; and a polarization converting device array converting each of the pencils of non-polarized partial light emitted through the second lens array into linearly polarized light, and the polarization converting device array comprises a pair of prism blocks including a polarization splitting surface, a reflective surface and a half-wave plate all of which are the same as those comprised in the polarization converting device according to the second aspect of the invention, and the pair of prism blocks are symmetrically opposed, and a plurality of pairs of prism blocks are disposed in parallel.

A projector according to a second aspect of the invention comprises: a light source; an illumination optical system dividing a non-polarized luminous flux emitted from the light source into a plurality of pencils of partial light to emit the plurality of pencils of partial light as illuminating light; an image display device modulating light emitted from the illumination optical system according to a given image signal; and a projecting means projecting light modulated by the image display device, and as the illumination optical system, the illumination optical system according to the second aspect of the invention is comprised.

As the polarization converting devices according to the first and the second aspects of the invention have the above-described structure, the thickness of a device substrate can be reduced, and parts can be downsized. Moreover, by the reduction in the thickness of the substrate, the amount of eclipse of light on the outgoing side of the polarization converting device can be reduced, thereby the light-use efficiency can be improved.

In the illumination optical systems according to the first and the second aspects of the invention, as the polarization converting device array has the above-described structure, in the polarization converting device array, the shift amount of the optical axis of a light beam reflected by the polarization splitting surface and the reflective surface to be emitted is reduced, compared to a conventional one, and a difference between the optical path lengths of the light beam and a light beam passing through the polarization splitting surface in the substrate is reduced. Therefore, compared to the conventional one, characteristics in an illumination range and light-use efficiency can be improved. Further, the thickness of the polarization converting device array can be reduced, so the whole length of the illumination optical system can be reduced.

In the projectors according to the first and the second aspects of the invention, as the illumination optical system has the above-described structure, illuminating light with efficiency and superior illumination characteristics can be obtained, thereby a good-quality image can be displayed.

Other and further objects, features and advantages of the invention will appear more fully from the following description.

DETAILED DESCRIPTION OF THE PREFERRED EMBODIMENTS

Preferred embodiments of the invention will be described in more detail below referring to the accompanying drawings.

Figure 4:
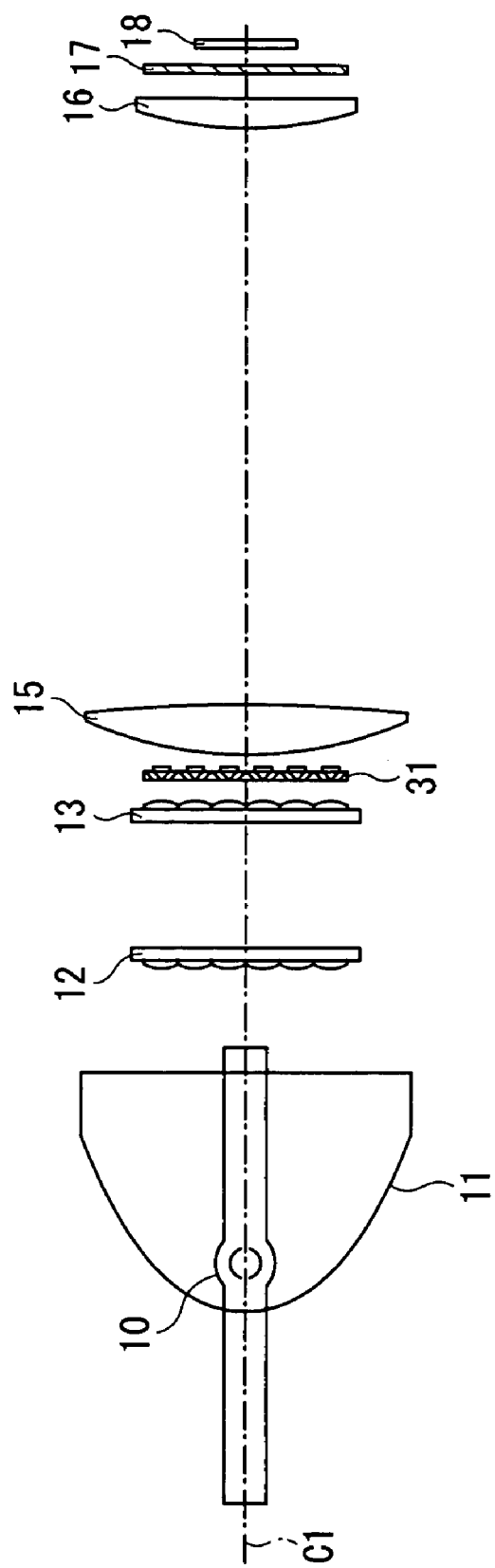
FIG. 4 is an illustration of an example of a light irradiation apparatus according to an embodiment of the invention.

Before describing the structure of a polarization converting device according to an embodiment of the invention, the whole structure of an apparatus using the polarization converting device will be described. FIG. 4 shows an example of a light irradiation apparatus using the polarization converting device and an illumination optical system according to the embodiment. The light irradiation apparatus illuminates, for example, an image display panel 18 such as a liquid crystal display panel with linearly polarized light. The light irradiation apparatus comprises a light source 10, a first lens array 12, a second lens array 13 and a polarization converting device array 31 along an optical axis C1. The light irradiation apparatus further comprises a main condenser lens 15, a channel condenser lens 16 and an incoming side polarizing plate 17.

The light source 10 include, for example, a reflector 11 in which a reflective surface is paraboloid. For example, when a color image is displayed, the light source 10 emits white light including red light (R), blue light (B) and green light (G), and includes, for example, a halogen lamp, a metal halide lamp or a xenon lamp.

The first lens array 12, the second lens array 13 and the polarization converting device array 31 constitute a main portion of the illumination optical system according to the embodiment, and have a function of equalizing light from the light source 10 and converting a luminous flux in a random polarization direction into linearly polarized light.

The main condenser lens 15 and the channel condenser lens 16 have a function of condensing a linearly polarized luminous flux emitted from the polarization converting device array 31 to project the luminous flux onto the image display panel 18 through the incoming side polarizing plate 17. The incoming side polarizing plate 17 lets only linearly polarized light in a predetermined direction pass through to project the linearly polarized light onto the image display panel 18.

Figure 7:
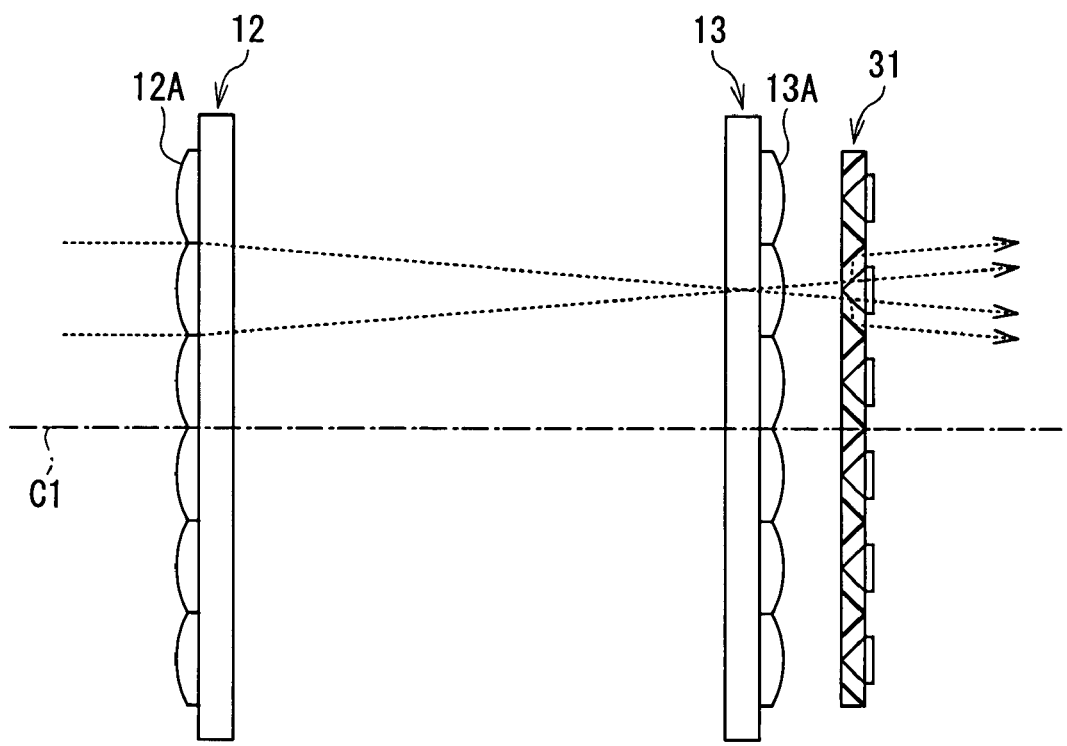
FIG. 7 is an illustration of an example of an illumination optical system according to an embodiment of the invention.

As shown in an enlarged view of FIG. 7, the first lens array 12 includes a plurality of convex lens cells 12A with positive refractive power which are arranged in matrix form. The second lens array 13 includes a plurality of convex lens cells 13A with positive refractive power each corresponding to each lens cell 12A of the first lens array 12, and the plurality of convex lens cells 13A are arranged in matrix form. The first lens array 12 has a function of dividing a non-polarized luminous flux emitted from the light source 10 into a plurality of pencils of partial light. The second lens array 13 superimposes the pencils of partial light divided by the first lens array on an illumination area.

The vertex position of each lens cell 12A constituting the first lens array 12 is preferably decentered from the central position of an aperture corresponding to each lens cell 12A. Thereby, light condensation to an aperture portion of an incident surface of the polarization converting device array 31 can be improved.

The polarization converting device array 31 is the most characteristic portion in the embodiment, and has a function of converting the incident non-polarized luminous flux into linearly polarized light. The structure of the polarization converting device array 31 will be described in detail later.

Figure 5:
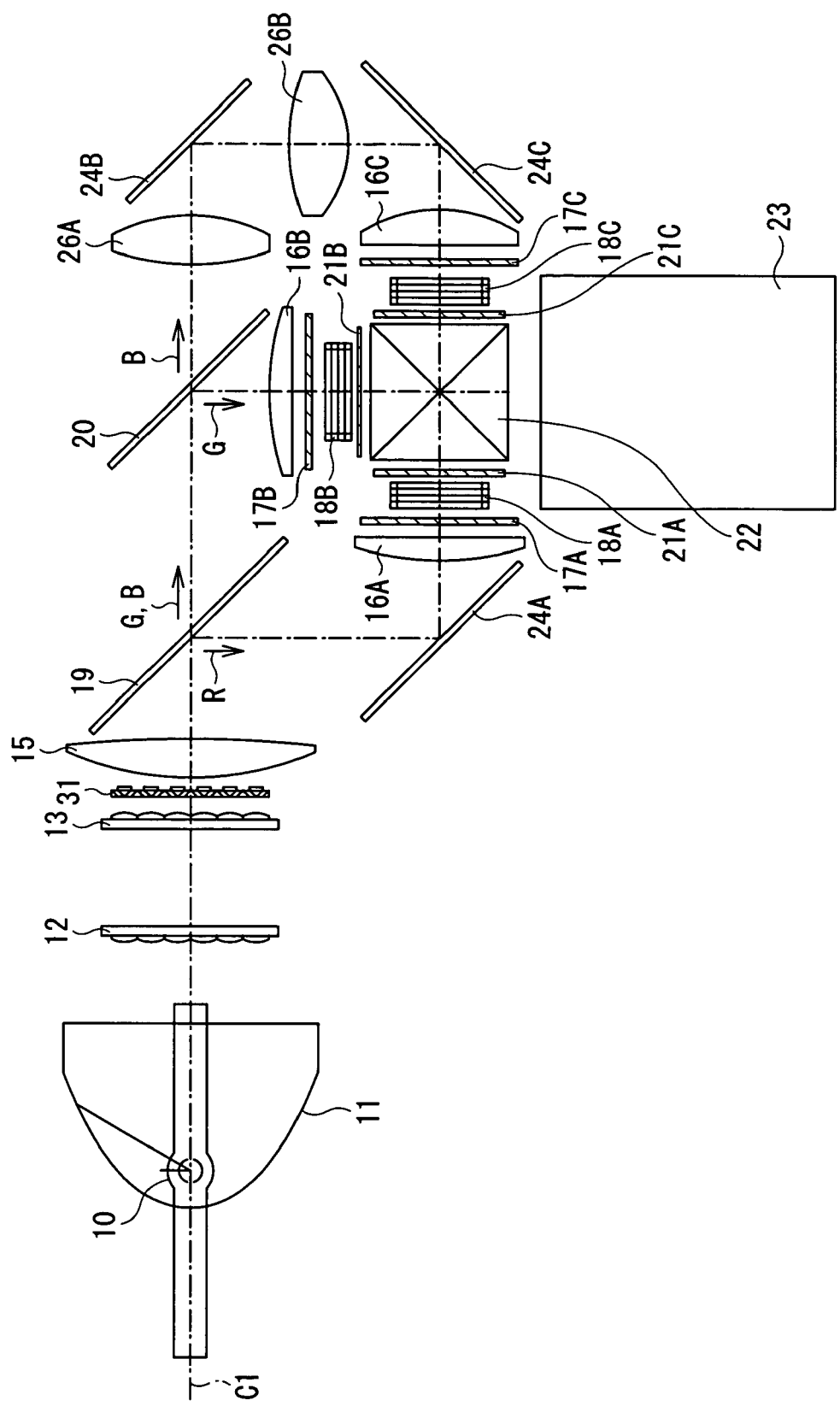
FIG. 5 is an illustration of an example of a projector according to an embodiment of the invention.

FIG. 5 shows an example of a projector using the polarization converting device and the illumination optical system according to the embodiment. In the description below, like components are denoted by like numerals as of the light irradiation apparatus shown in FIG. 4, and will not be further explained.

The projector is a so-called three-panel transmissive projector which displays a color image by using three transmissive image display panels 18A, 18B and 18C. The projector comprises the first lens array 12, the second lens array 13, the polarization converting device array 31 and a dichroic mirror 19 which divides white light incident from the light source 10 through the main condenser lens 15 into red light R and light of other colors G and B. A total reflection mirror 24A is disposed on an optical path of the red light divided by the dichroic mirror 19.

The projector further comprises a dichroic mirror 20 disposed on an optical path of the green light G and the blue light B divided by the dichroic mirror 19. The dichroic mirror 20 has a function of dividing the incident green light G and the incident blue light B from each other. A relay lens 26A, a total reflection mirror 24B, a relay lens 26B and a total reflection mirror 24C are disposed on an optical path of the blue light B divided by the dichroic mirror 20 in the order in which the light travels.

In the projector, channel condenser lenses 16 (16A, 16B and 16C), incoming side polarizing plates 17A, 17B and 17C, image display panels 18A, 18B and 18C, and outgoing side polarizing plates 21A, 21B and 21C are disposed in order from a light incident side on the optical paths of the red light R, the green light G and the blue light B, respectively.

The image display panels 18A, 18B and 18C are made of, for example, a liquid crystal display panel, and spatially modulate the incident linearly polarized light according to a given image signal to emit the modulated light. The image display panels 18A, 18B and 18C correspond to a specific example of "an image display device" in the invention.

The projector further comprises a dichroic prism 22 and a projection lens 23. The dichroic prism 22 combines the modulated light of red, green and blue emitted from the image display panels 18A, 18B and 18C through the outgoing side polarizing plates 21A, 21B and 21C. The projection lens 23 projects the light combined by the dichroic prism 22 onto a screen (not shown). The projection lens 23 corresponds to a specific example of "a projecting means" in the invention.

Next, the structure of the polarization converting device array 31 will be described in detail below. As shown in an enlarged view of FIG. 8, the polarization converting device array 31 comprises a plurality of polarization splitting films 31A and a plurality of reflective surfaces 31B which are alternately arranged. A plurality of half-wave plates 31C are arranged on the outgoing side of the polarization converting device array 31 with a predetermined spacing.

The polarization splitting film 31A has a function of dividing incident light into two polarized components orthogonal to each other through reflecting the incident light and allowing the incident light to pass through. For example, light having passed through a working surface (polarization splitting surface) of the polarization splitting film 31A becomes a P-polarized component, and light reflected by the working surface becomes a S-polarized component. Herein, the S-polarized component reflected by the polarization splitting film 31A corresponds to a specific example of "a first polarized component" in the invention, and the P-polarized component having passed through the polarization splitting film 31A corresponds to a specific example of "a second polarized component" in the invention.

The reflective surface 31B has a function of reflecting the S-polarized component reflected by the polarization splitting film 31A in the same direction as an outgoing direction of the P-polarized component having passed through the polarization splitting film 31A.

The polarization splitting film 31A is disposed at approximately 45° upward and downward with respect to the optical axis C1, thereby the polarization splitting film 31A is formed in the shape of the letter V, of which the apex is pointed to a direction where the incident light enters (the left side in the drawing). The reflective surface 31B has such a shape that the shape of the polarization splitting film 31A is flipped horizontally, thereby it is formed in the shape of the letter V of which the apex is pointed to a direction where the polarized component is emitted (the right side in the drawing). A plurality of pairs of the polarization splitting film 31A with the shape of the letter V and the reflective surface 31B with the shape of the letter V in which their apexes are pointed to different directions are disposed in parallel. In this case, the polarization splitting film 31A and the reflective surface 31B are disposed so as not to overlay each other in a thickness direction (an optical axis direction).

The half-wave plate 31C is disposed on an optical path of either the S-polarized component or the P-polarized component on the outgoing side of the polarization converting device array 31 to convert the polarization direction of either the S-polarized component or the P-polarized component into the same polarization direction as that of the other polarized component. In an example shown in FIG. 8, the half-wave plate 31C is disposed on the optical path of the P-polarized component to convert outgoing light into a S-polarized component.

Moreover, the structure of the polarization converting device array 31 will be described below from the other point of view.

Figure 9:
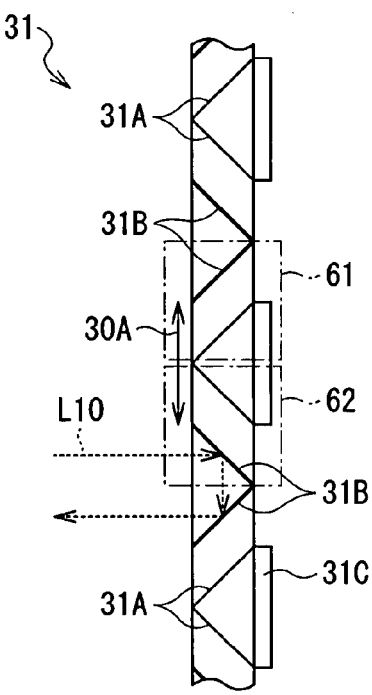
FIG. 9 is an illustration showing the optical action of the polarization converting device according to the embodiment of the invention.

As shown in FIG. 9, the polarization converting device array 31 comprises a pair of prism blocks 61 and 62. Each of the prism blocks 61 and 62 includes the polarization splitting film 31A disposed at an angle with respect to the optical axis, the reflective surface 31B disposed at an angle in the same direction as the polarization splitting film 31A, and the half-wave plate 31C disposed on a light-outgoing side. The pair of the prism blocks 61 and 62 are symmetrically opposed. A plurality of pairs of the prism blocks 61 and 62 are disposed in parallel to constitute the polarization converting device array 31.

The pair of the prism blocks 61 and 62 corresponds to a unit block 160 shown in a conventional polarization converting device array 114 (refer to FIG. 2) in terms of optical action.

Figures 10A, 10B, 10C, 10D, 10E, 10F:
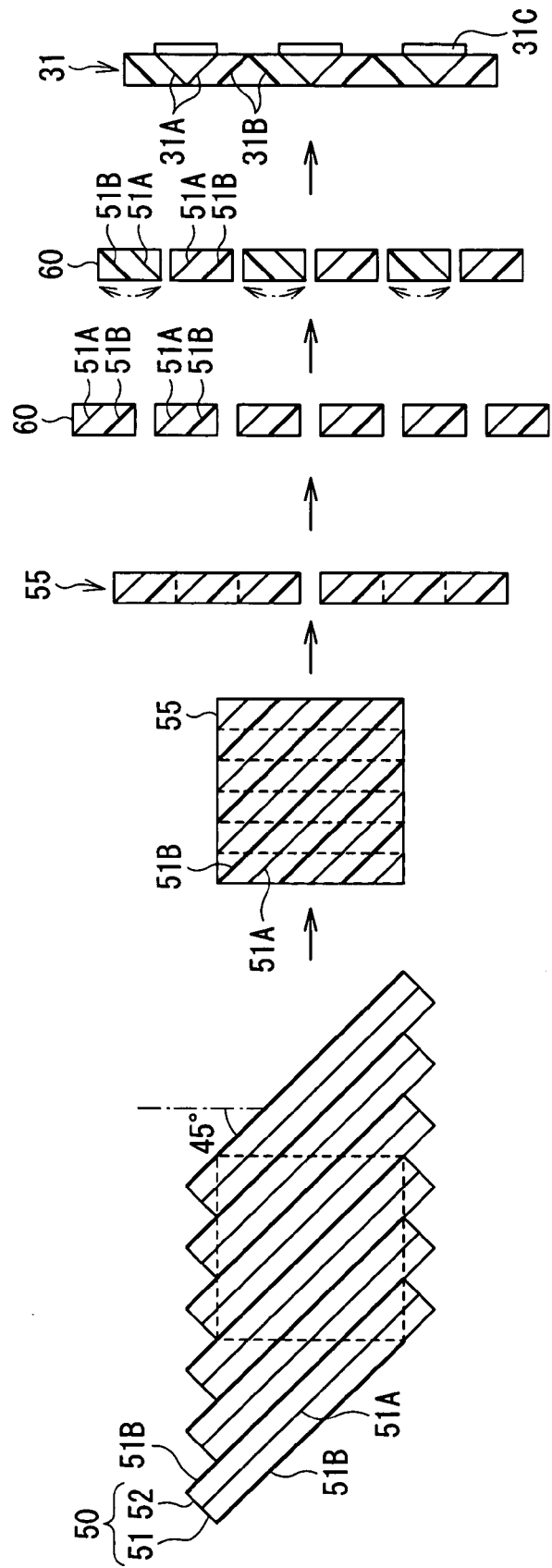
FIGS. 10A through 10F are illustrations for describing a specific example of a method of manufacturing the polarization converting device according to the embodiment of the invention.

FIGS. 10A through 10F show an example of a method of manufacturing the polarization converting device array 31. When the polarization converting device array 31 is manufactured, at first, two glass plates 51 and 52 both having a reflective film 51B on a surface thereof are bonded together with a polarization splitting film 51A in between. A plurality of such pairs 50 of the glass plates 51 and 52 are bonded together in a state that the pairs 50 are inclined at approximately 45° as shown in FIG. 10A. Next, a block with a predetermined size as shown by a dotted line in FIG. 10A is cut out from the bonded pairs of glass plates 51 and 52. Then, the block is cut into strap-shaped blocks 55 as shown by dotted lines in FIG. 10B.

As shown by dotted lines in FIG. 10C, the strap-shaped blocks 55 are further cut into prism blocks 60 each including one polarization splitting film 51A and one reflective film 51B. Some of a plurality of prism blocks 60 obtained as described above (refer to FIG. 10D) are flipped so that the prism blocks 60 are symmetrically opposed as shown in FIG. 10E. Finally, in such an arrangement of the prism blocks 60, the prism blocks 60 are bonded together as shown in FIG. 10F, and the half-wave plate 31C is bonded in a predetermined position on a surface. Thus, the polarization converting device array 31 comprising the polarization splitting film 31A and the reflective surface 31B can be manufactured.

Next, actions and functions of the light irradiation apparatus and the projector formed as described above will be described below.

Figure 6:
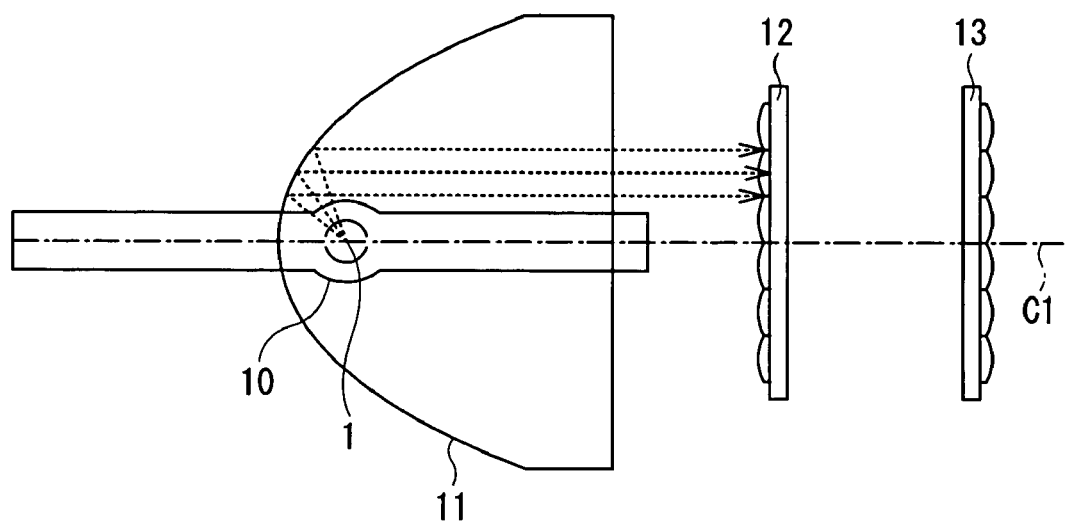
FIG. 6 is an illustration for describing optical action of a light source portion.

At first, general actions of the light irradiation apparatus and the projector will be described below. In the light irradiation apparatus shown in FIG. 4, a luminous flux from the light source 10 is emitted toward the first lens array 12. As shown in FIG. 6, the light source 10 is disposed on a focal point 1 of the reflector 11, so the luminous flux is converted into a substantially parallel luminous flux by the reflector 11 to enter into the first lens array 12.

In the first lens array 12, by the function of each lens cell 12A, the incident light is divided into a plurality of luminous fluxes, and as shown in FIG. 7, the plurality of luminous fluxes are condensed in proximity to the aperture portion of each lens cell 13A of the corresponding second lens array 13. A non-polarized luminous flux having passed through the second lens array 13 enters into the polarization converting device array 31. The polarization converting device array 31 converts the incident luminous flux into required linearly polarized light to emit the light.

The linearly polarized light emitted from the polarization converting device array 31 is condensed by the functions of the main condenser lens 15 and the channel condenser lens 16, and then enters into the image display panel 18 through the incoming side polarizing plate 17 as illuminating light.

In the projector shown in FIG. 5, white light from the light source 10 enters into the dichroic mirror 19 through the first lens array 12, the second lens array 13, the polarization converting device array 31 and the main condenser lens 15. The dichroic mirror 19 divides the incident light into red light R and light of other colors G and B to emit them.

The red light R divided by the dichroic mirror 19 enters into the channel condenser lens 16A, the incoming side polarizing plate 17A and the image display panel 18A through the total reflection mirror 24A.

The green light G and the blue light B are divided by the dichroic mirror 20. The divided green light G enters into the channel condenser lens 16B, the incoming side polarizing plate 17B and the image display panel 18B. The blue light B enters into the channel condenser lens 16C, the incoming side polarizing plate 17C and the image display panel 18C through the relay lens 26A, the total reflection mirror 24B, the relay lens 26B and the total reflection mirror 24C.

In the image display panels 18A, 18B and 18C, the incident linearly polarized light is spatially modulated according to an inputted image signal to emit the modulated light. Each light of the colors modulated by the image display panels 18A, 18B and 18C enters into the dichroic prism 22 through the outgoing side polarizing plates 21A, 21B and 21C, respectively, to combine the colors. The combined light is projected onto a screen (not shown) by the projection lens 23. Thereby, an enlarged image is formed on the screen.

Figure 8:
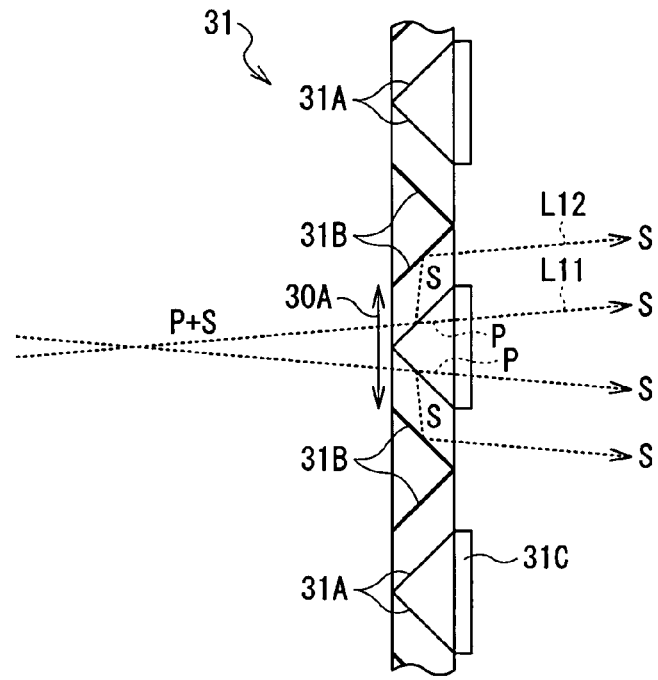
FIG. 8 is an illustration showing an example of a polarization converting device according to an embodiment of the invention and its optical action.

Next, the function of the polarization converting device array 31 will be described below. As shown in FIG. 8, in the polarization converting device array 31, light incident from the incoming side aperture portion 30A is divided into the S-polarized component and the P-polarized component by the polarization splitting film 31A. The S-polarized light reflected by the polarization splitting film 31A is further reflected by the reflective surface 31B to be emitted from the polarization converting device array 31. On the other hand, the P-polarized light having passed through the polarization splitting film 31A passes through the half-wave plate 31C to be converted into S-polarized light, then the S-polarized light is emitted from the polarization converting device array 31. As a result, all luminous fluxes emitted from the polarization converting device array 31 are emitted as linearly S-polarized light. The S-polarized light is used as illuminating light to the image display panel 18 (18A, 18B and 18C).

In addition, for example, when the position of the half-wave plate 31C is shifted, all final polarized components can be converted into P-polarized light. More specifically, in the example of FIG. 8, the half-wave plate 31C is disposed in a position corresponding to the polarization splitting film 31A, but when the half-wave plate 31C is disposed in a position corresponding to the reflective surface 31B, the S-polarized light reflected by the reflective surface 31B can be converted into P-polarized light.

Figure 1:
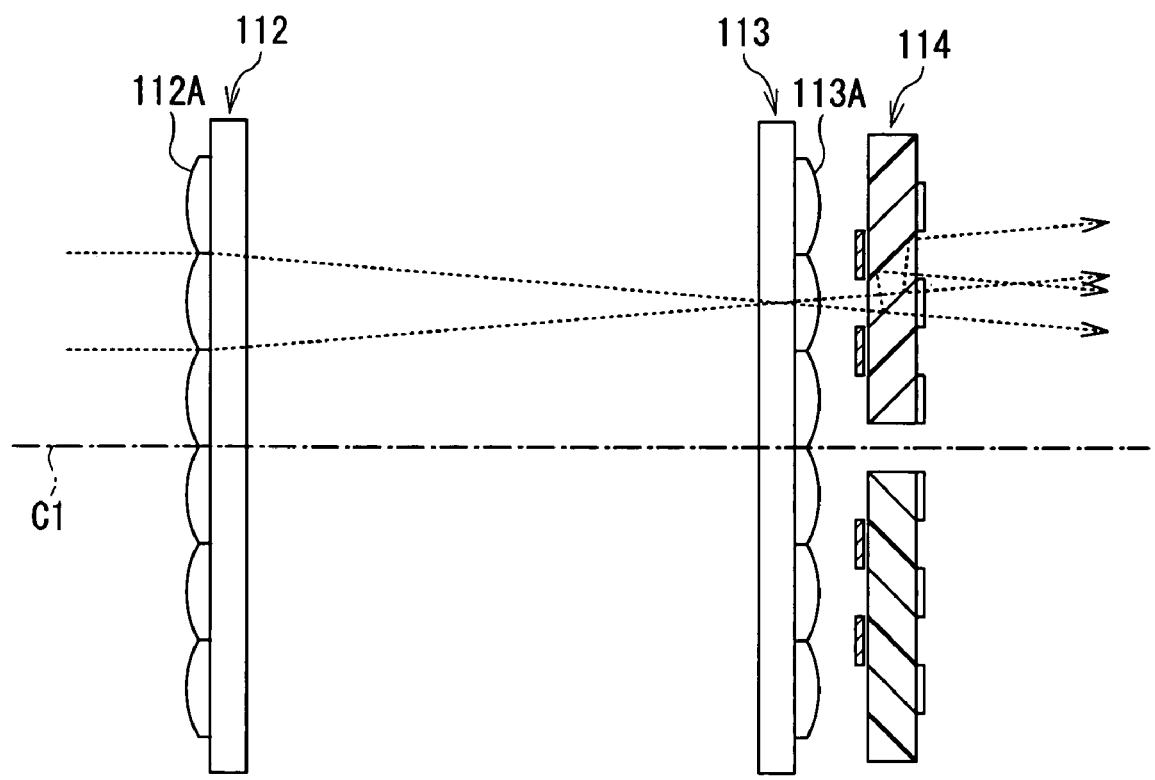
FIG. 1 is an illustration of an example of a conventional illumination optical system.
Figure 2:
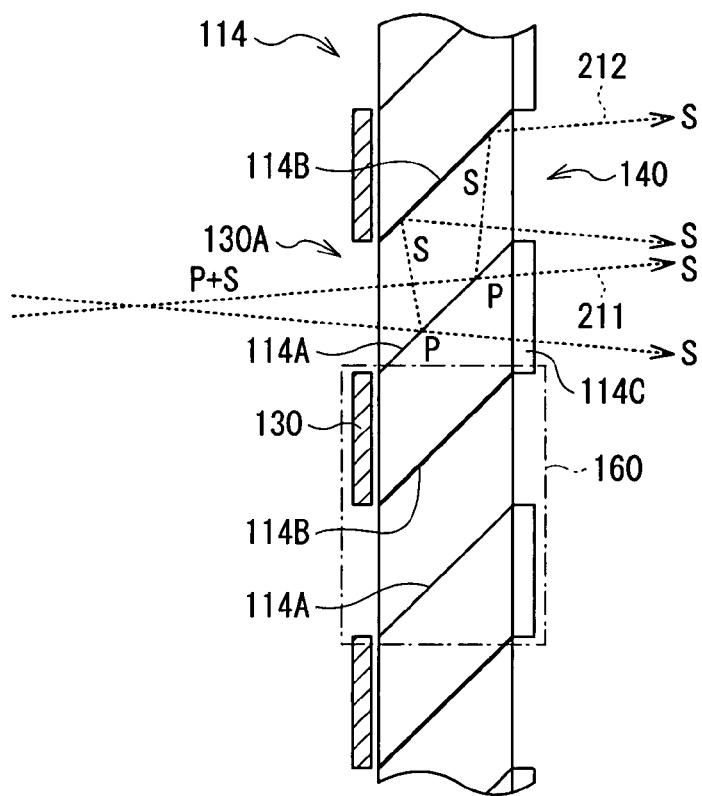
FIG. 2 is an illustration showing an example of the conventional polarization converting device and its optical action.
Figure 3:
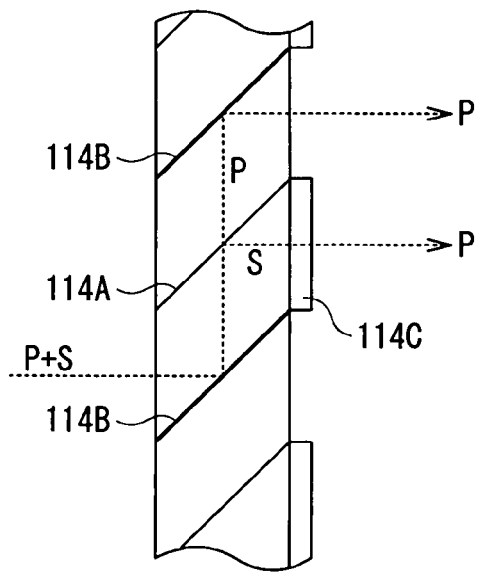
FIG. 3 is an illustration showing the optical action of the conventional polarization converting device.

Next, the function of the polarization converting device array 31 will be further described in comparison with the conventional polarization converting device array 114 (refer to FIG. 2).

As described in "Description of the Related Art", in the conventional polarization converting device array 114, the light beam 212 reflected by the polarization splitting film 114A and then by the reflective surface 114B has an optical path length in a substrate of the polarization converting device which is twice as long as the thickness of the substrate, compared to the light beam 211 having passed through the polarization splitting film 114A. Therefore, in the light beam 212, the spread of a luminous flux is larger than that in the light beam 211, so the amount of eclipse of the luminous flux is large in an aperture portion 140 for the light beam 212, which causes a decline in light-use efficiency.

On the other hand, the polarization converting device array 31 according to the embodiment has such a structure that the prism blocks 61 and 62 each including the polarization splitting film 31A and the reflective surface 31B (refer to FIG. 9) face each other, so compared to the conventional polarization converting device array 114, while keeping the size of the incoming side aperture portion 30A the same, the thickness of the substrate can be reduced to half. Thereby, a difference between the optical path lengths of a light beam L12 (refer to FIG. 8) reflected by the polarization splitting film 31A and then by the reflective surface 31B and a light beam L11 having passed through the polarization splitting film 31A in the substrate can be reduced to half, compared to the conventional polarization converting device array 114. Therefore, the spread of the outgoing luminous flux becomes smaller than that in the conventional polarization converting device array 114, and the amount of eclipse of light can be reduced. As a result, the light-use efficiency can be improved.

Moreover, in addition to the optical path length in the substrate, the shift amount of the optical axis of the light beam L12 can be reduced to half, compared to the conventional polarization converting device array 114. Therefore, the performance of an illumination image of the first lens array 12 which is illuminated onto the image display panel 18 can be improved, and the light-use efficiency can be improved. As can be seen from the comparison between FIGS. 2 and 8, conventionally, the optical axis is shifted to only one side (top side in FIG. 2), but in the polarization converting device array 31 according to the embodiment, the optical axis is shifted to both directions, that is, a top side and a bottom side, so the balance of the shape of an intensity distribution on the image display panel 18 can be improved.

Further, in the conventional polarization converting device array 114, it is necessary that the light-shielding plate 130 such as a light-shielding slit, or a light-shielding film is disposed on the incoming side of the polarization converting device array 114 so that light is incident only from the aperture portion 130A. On the other hand, in the polarization converting device array 31 according to the embodiment, as shown in FIG. 9, light L10 having entered into a portion except for the incoming side aperture portion 30A is reflected by the reflective surface 31B to return to a direction where the light entered. Therefore, the light-shielding plate 130 which is conventionally required is unnecessary.

As described above, in the polarization converting device array 31 according to the embodiment, while keeping the incoming side aperture size the same, the thickness of the substrate of the polarization converting device can be reduced, compared to the conventional one. Thereby, parts of the polarization converting device array 31 can be downsized. Moreover, the whole length of the illumination optical system including the polarization converting device array 31 can be reduced. Further, as the thickness of the substrate is reduced, the amount of eclipse of light by the outgoing side aperture portion of the polarization converting device array 31 can be reduced, thereby the light-use efficiency can be improved.

Moreover, the shift amount of the optical axis of the light beam L12 which is reflected by the polarization splitting film 31A and the reflective surface 31B to be emitted can be reduced, compared to the conventional one, and a difference between optical path lengths of the light beam L12 and the light beam L11 having passed through the polarization splitting film 31A in the substrate can be reduced, so characteristics in a panel illumination range can be improved, compared to the conventional one, and the light-use efficiency can be improved. Further, in the embodiment, the light L10 having entered into the portion except for the incoming side aperture portion 30A (refer to FIG. 9) is returned to the incident direction by the reflective surface 31B, so the light-shielding plate or the like which is conventionally required is no longer required, so the structure can be simplified and downsized. Further, when the polarization converting device array 31 is used for the illumination optical system of the projector, illuminating light with efficiency and superior illumination characteristics can be obtained, thereby a good-quality image can be displayed.

[Another Embodiment]

Next, another embodiment of the invention will be described below. Only components different from those in the above embodiment will be described below.

Figure 11:
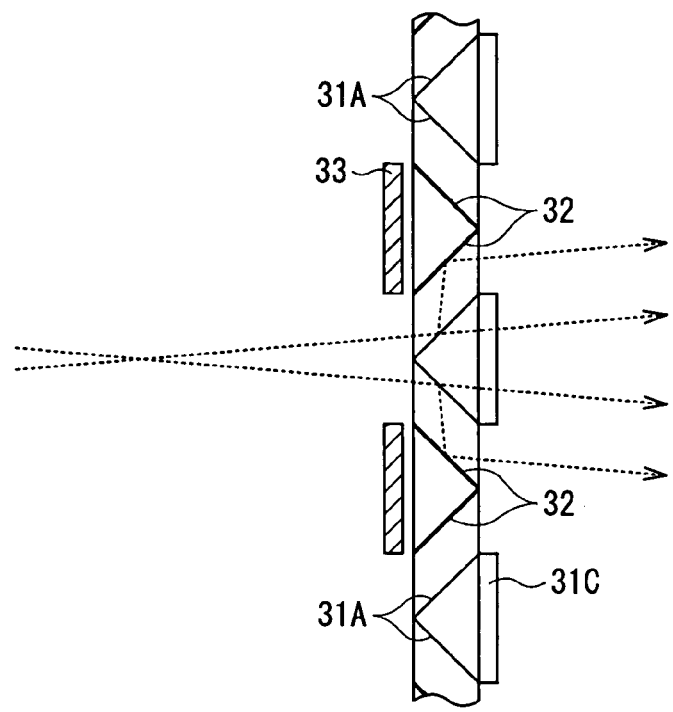
FIG. 11 is an illustration of an example of a polarization converting device according to another embodiment of the invention.

FIG. 11 shows another example of the polarization converting device array 31. In the above embodiment, as shown in FIG. 9, the light L10 having entered into a portion except for the incoming side aperture portion 30A is returned to the incident direction by the reflective surface 31B.

On the other hand, in the polarization converting device array shown in FIG. 11, a light-shielding member 33 (a light-shielding plate, a light-shielding film or the like) is disposed in a position corresponding to the incoming side reflective surface 31B (that is, a portion except for the incoming side aperture portion 30A). In this case, the light L10 having entered into the portion except for the incoming side aperture portion 30A is shielded by the light-shielding member 33, so the reflective surface 31B may be a second polarization splitting film 32. When the reflective surface 31B is the second polarization splitting film 32, S-polarized light incident from the incoming side aperture portion 30A and reflected by the first polarization splitting film 31 is reflected in the outgoing direction by the second polarization splitting film 32 as in the case where the reflective surface 31B is used. In other words, the second polarization splitting film 32 functions as a reflective surface to the S-polarized light.

Figure 12:
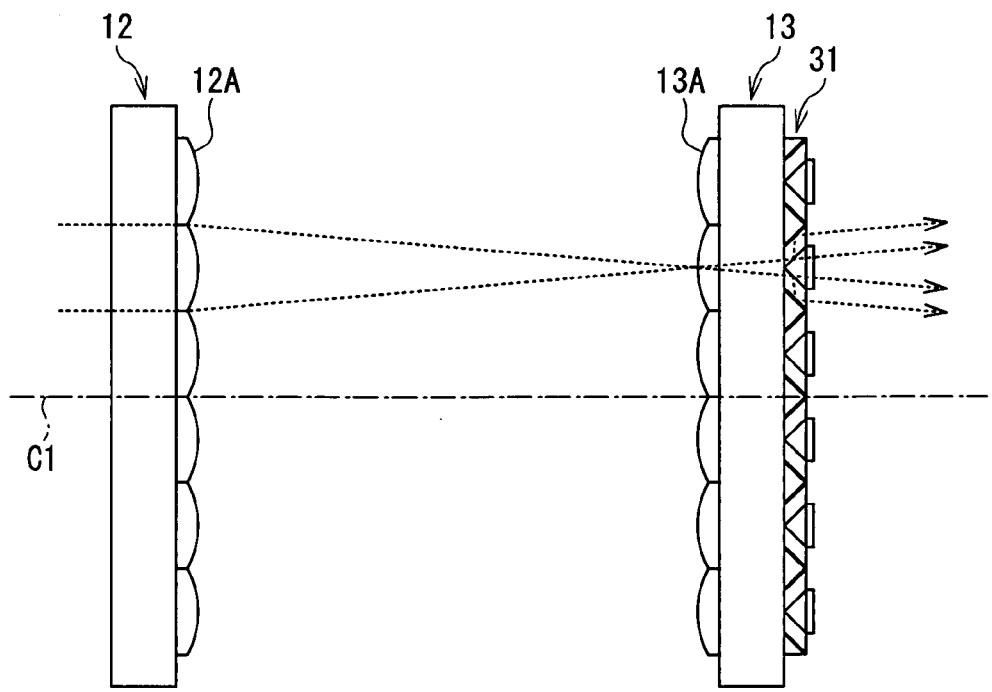
FIG. 12 is an illustration of an example of an illumination optical system according to another embodiment of the invention.

FIG. 12 shows another example of the illumination optical system. In the illumination optical system shown in FIG. 7, the second lens array 13 and the polarization converting device array 31 are divided from each other. In the illumination optical system shown in FIG. 12, the second lens array 13 and the polarization converting device array 31 are combined so as to become one unit. In other words, a substrate of the second lens array 13 is disposed on the incident surface of the polarization converting device array 31 so as to become one unit. Each lens cell 13A is disposed on the light-incident side of the second lens array 13.

The invention is not limited to the above embodiments, and can be variously modified. For example, in the above embodiments, as an example of the projector, the three-panel transmissive projector is described; however, the invention is widely applicable to any other projectors such as a single-plate projector and a reflective projector.

As described above, in the polarization converting device according to an aspect of the invention, the polarization splitting surface is formed in the shape of the letter V, of which the apex is pointed to a direction where the incident light enters, and the reflective surface is formed in the shape of the letter V, of which the apex is pointed to a direction where the first and the second polarized components are emitted, so the thickness of a device substrate can be reduced, and parts can be downsized, compared to the conventional one. Moreover, by the reduction in the thickness of the substrate, the amount of eclipse of light on the outgoing side can be reduced, and the light-use efficiency can be improved.

The polarization converting device according to another aspect of the invention comprises a pair of prism blocks each including the polarization splitting surface inclined with respect to the optical axis, the reflective surface inclined toward the same direction as the polarization splitting surface and reflecting the first polarized component reflected by the polarization splitting surface to the direction where the second polarized component having passed through the polarization splitting surface is emitted, and the half-wave plate disposed on the optical path of either the first or the second polarized component so that the polarization direction of the first or the second polarized component is converted into the same polarization direction as that of the other polarized component, and the pair of prism blocks are symmetrically opposed, so compared to the conventional one, the thickness of a device substrate can be reduced, and parts can be downsized. Moreover, by the reduction in the thickness of the substrate, the amount of eclipse of light on the outgoing side can be reduced, and the light-use efficiency can be improved.

The illumination optical system according to an aspect of the invention comprises the polarization converting device array including the polarization splitting surface, the reflective surface and the half-wave plate all of which are the same as those in the polarization converting device according to the aspect of the invention, and in the polarization converting device array, a plurality of pairs of the polarization splitting surface with the shape of the letter V and the reflective surface with the shape of the letter V in which the apexes are pointed to different directions are disposed in parallel, so in the polarization converting device array, the shift amount of the optical axis of the light beam reflected by the polarization splitting surface and the reflective surface to be emitted can be reduced, compared to the conventional one, and a difference between the optical path lengths of the light beam and the light beam having passed through the polarization splitting surface in the substrate can be reduced. Therefore, illuminating light with efficiency and superior illumination characteristics can be obtained, compared to the conventional one. Further, the thickness of the polarization converting device array can be reduced, so the whole length of the illumination optical system can be reduced.

The illumination optical system according to another aspect of the invention comprises the polarization converting device array including a pair of prism blocks including the polarization splitting surface, the reflective surface and the half-wave plate all of which are the same as those in the polarization converting device according to anther aspect of the invention, and the polarization converting device array including a plurality of pairs of prism blocks disposed in parallel is used, so in the polarization converting device array, the shift amount of the optical axis of the light beam reflected by the polarization splitting surface and the reflective surface to be emitted can be reduced, compared to the conventional one, and a difference between the optical path lengths of the light beam and the light beam having passed through polarization splitting surface in the substrate can be reduced. Therefore, illuminating light with efficiency and superior illumination characteristics can be obtained, compared to the conventional one. Further, the thickness of the polarization converting device array can be reduced, so the whole length of the illumination optical system can be reduced.

In the projector according to an aspect of the invention, as the illumination optical system, the illumination optical system according to the aspect of the invention is used, so illuminating light with efficiency superior illumination characteristics can be obtained, and good-quality image can be displayed.

In the projector according to another aspect of the invention, as the illumination optical system, the illumination optical system according to another aspect of the invention is used, so illuminating light with efficiency and superior illumination characteristics can be obtained, and good-quality image can be displayed.

Obviously many modifications and variations of the present invention are possible in the light of the above teachings. It is therefore to be understood that within the scope of the appended claims the invention may be practiced otherwise than as specifically described.

What is claimed is:

1. A polarization converting device, comprising:

a pair of prism blocks each including:

a polarization splitting surface being inclined with respect to an optical axis, and dividing incident light into a first polarized component and a second polarized component orthogonal to each other through reflecting the incident light and allowing the incident light to pass therethrough;

a reflective surface being inclined toward the same direction as the polarization splitting surface, and reflecting the first polarized component reflected by the polarization splitting surface toward a direction where the second polarized component having passed through the polarization splitting surface is emitted; and a half-wave plate being disposed on the optical path of either the first or the second polarized component, and converting the polarization direction of either the first or the second polarized component into the same polarization direction as that of the other polarized component, wherein the pair of prism blocks are symmetrically opposed.

* * * * *